US012331581B2

(12) United States Patent
Freedman

(10) Patent No.: US 12,331,581 B2
(45) Date of Patent: Jun. 17, 2025

(54) SAFETY AND SECURITY SUPPORT FOR VENTABLE DOUBLE HUNG WINDOW

(71) Applicant: SureLock Safety, LLC, E. Brockaway, CT (US)

(72) Inventor: Robert Freedman, E. Brockaway, CT (US)

(73) Assignee: SureLock Safety, LLC, E. Brockaway, CT (US)

( * ) Notice: Subject to any disclaimer, the term of this patent is extended or adjusted under 35 U.S.C. 154(b) by 118 days.

(21) Appl. No.: 18/137,795

(22) Filed: Apr. 21, 2023

(65) Prior Publication Data

US 2024/0352779 A1 Oct. 24, 2024

(51) Int. Cl.
*E05F 5/00* (2017.01)

(52) U.S. Cl.
CPC ......... *E05F 5/003* (2013.01); *E05Y 2900/148* (2013.01)

(58) Field of Classification Search
CPC ..... E05D 2700/10; E05C 17/04; E05C 17/12; E05C 17/46; E05C 17/48; E05F 5/003
USPC ........................................... 49/449, 450, 451
See application file for complete search history.

(56) References Cited

U.S. PATENT DOCUMENTS 1,552,351 A * 9/1925 Setterstrom ............. E05F 11/00 292/306
2,714,033 A * 7/1955 Lewgowd ............... E05D 13/06 292/276
3,136,290 A * 6/1964 Bailey ................. E05B 65/0888 292/DIG. 20
3,637,247 A * 1/1972 Manion ............... E05B 65/0888 292/262
4,005,889 A * 2/1977 Patrick ................ E05B 65/0888 292/262
4,758,033 A * 7/1988 Wolf ....................... E05B 65/08 292/305
4,792,169 A * 12/1988 Petry .................. E05B 65/0888 292/276
4,927,198 A * 5/1990 Fennell ............... E05B 65/0888 292/306
6,778,086 B2 * 8/2004 Morrone ............. E05B 65/0888 340/545.7
7,325,847 B1 * 2/2008 Tanner .................... E05C 17/54 292/259 R
7,497,490 B2 * 3/2009 Yamaguchi ............. E05C 17/30 292/259 R
8,556,307 B1 * 10/2013 Schaffhausen ...... E05B 65/0888 292/DIG. 60
8,659,425 B2 * 2/2014 Kersch ................... G08B 13/08 340/541
2005/0039407 A1 * 2/2005 Atkisson ................. E05D 15/22 49/449

(Continued)

*Primary Examiner* — Gregory J Strimbu
(74) *Attorney, Agent, or Firm* — Pierson Ferdinand LLP; Rachel H. Huffstetler

(57) ABSTRACT

A safety and security window support for a ventable double hung window which provides both limited opening of the bottom sash and structural integrity. The window support includes a longitudinal first member, a lateral second member secured to the first member, and a clamp configured to receive the first member and to be slidable along the length thereof. The clamp has a clamping flange for cooperating with the window frame to limit upward movement of the bottom sash.

11 Claims, 5 Drawing Sheets

(56) References Cited

U.S. PATENT DOCUMENTS

2008/0092451 A1* 4/2008 Famulare ............ E05B 65/0888
49/449
2009/0173012 A1* 7/2009 Luca ....................... E05F 5/003
49/506

* cited by examiner

SAFETY AND SECURITY SUPPORT FOR VENTABLE DOUBLE HUNG WINDOW

FIELD OF THE INVENTION

The present invention is directed to a safety and security support for double hung windows, more specifically, to a support which prevents tilting of the upper and lower sashes for security and weatherproofing and which permits limited venting of the bottom sash for child safety and security.

BACKGROUND OF THE INVENTION

Double hung windows are a common window configuration in residential and commercial properties. Double hung windows include a top sash and a bottom sash and both sashes are operable. To open or vent the window, the top sash slides down and the bottom sash slides up along the window channel. The top sash may be opened by itself, the bottom sash by itself, or both sashes may be opened for better air flow. Double hung windows are desirable for case of cleaning. Double hung windows come with tilt sashes that allow the upper and lower sashes to tilt inward (from the top). This allows both the interior and exterior glass to be cleaned from inside the room. This is especially helpful for windows above the first floor.

Features of double hung windows render them easy to open and structurally less sound. Windows that are easily opened, and particularly those at great heights, present a potential hazard for children. It is recommended that a window opening be limited to prevent window fall and injuries which may result from window fall. This applies to windows that have furniture placed near them to prevent your children from climbing and gaining access to an open window. Thus, limiting the amount of venting by the bottom sash prevents unintended egress through the window. To reduce the risk of window fall, double hung window vent stops are provided to limit the range of motion that the bottom sash may be lifted, such as less than four (4) inches.

From a security standpoint, limiting the ingress and egress of a window is also desirable. Intruders would prefer to enter a window which may be opened rather than breaking glass for entry or exit. A device for limiting raising the bottom sash a distance permitting ingress, thus, impedes entry or exit (and requires breaking the window), even if the window is unlocked. Moreover, if an intruder enters a residence or building, the intruder will be prevented from exiting quickly by opening the window and would have to break the glass. Traditional double hung window vents are positioned within the window channel to impede raising the bottom sash.

Double hung windows, with independently moving top and bottom tiltable sashes, provide less structural integrity due the ability of the sashes to move relative to one another and to tilt inward. The ability to tils inward may be impacted by extreme weather conditions including high wind conditions. It is believed that the structurally weakest part of double hung windows in high wind is where the top and bottom sashes meet. From a weatherproofing standpoint, e.g., high winds, it is desirable to prevent tilting of the windows under wind forces.

SUMMARY OF THE INVENTION

Therefore, it is an object of the present invention to provide a safety and security support for a ventable double hung window which provides both limited opening of the bottom sash and structural integrity. This is achieved according to the present invention by providing a support that limits upward movement of the bottom sash a predetermined distance and which is mounted at the intersection of the top and bottom sash. This provides protection against window fall and unintentional ingress and egress for added security. The present invention also provides added structural integrity to the window, which is beneficial, for example, under high wind events.

The present invention contributes to the overall safety and security of double hung windows by providing a window support having a longitudinal first member, a lateral second member secured to the first member, and a clamp configured to receive the first member and to be slidable along the length thereof. The clamp has a clamping flange for cooperating with the window frame to limit upward movement of the bottom window sash.

These and other objects are met by the invention as shown and described.

BRIEF DESCRIPTION OF THE DRAWINGS

The preferred embodiments described herein and illustrated by the drawings hereinafter be to illustrate and not to limit the invention, where like designations denote like elements.

DETAILED DESCRIPTION OF THE INVENTION

The present invention will now be described in detail hereinafter by reference to the accompanying drawings. The invention is not intended to be limited to the embodiments described; rather, this detailed description is provided to enable any person skilled in the art to make and practice the invention.

As used herein, the singular forms "a," "an" and "the" include plural referents unless the context clearly dictates otherwise. Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" and "select" or "selectively" mean that the subsequently described event or circumstance may or may not occur, and that the description includes instances where said event or circumstance occurs and instances where it does not. For the purposes of describing and defining the present invention it is noted that the use of relative terms, such as "substantially," "generally." "approximately," and the like, are utilized herein to represent an inherent degree of uncertainty that is attributed to any quantitative comparison, value, measurement, or other representation. These terms are also utilized herein to represent the degree by which a quantitative representation may vary from a stated reference without resulting in a change in the basic function of the subject matter at issue. The term "proximal" as used herein refers to the direction facing forward, away from the window, "distal" refers to the direction toward, and in the direction facing the window, "longitudinal" direction refers to the direction between the top and bottom ends, and the term "horizontal" refers to a direction opposite the longitudinal axis, at any angle.

Figure 1:
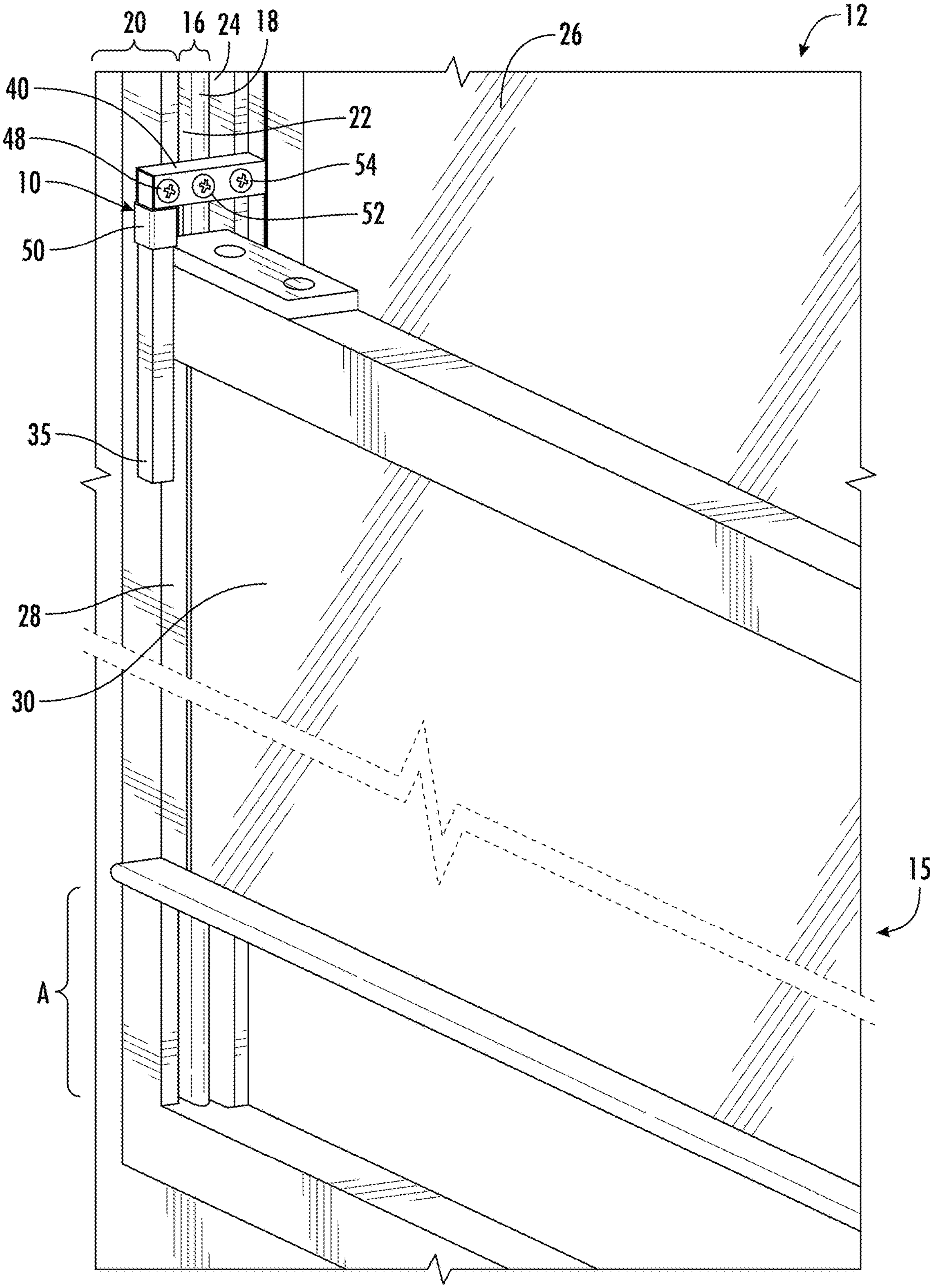
FIG. 1 is a perspective view of the of the window support mounted on a double hung window according to the present invention showing the bottom sash opened a predetermined amount as limited by the window support.
Figure 2:
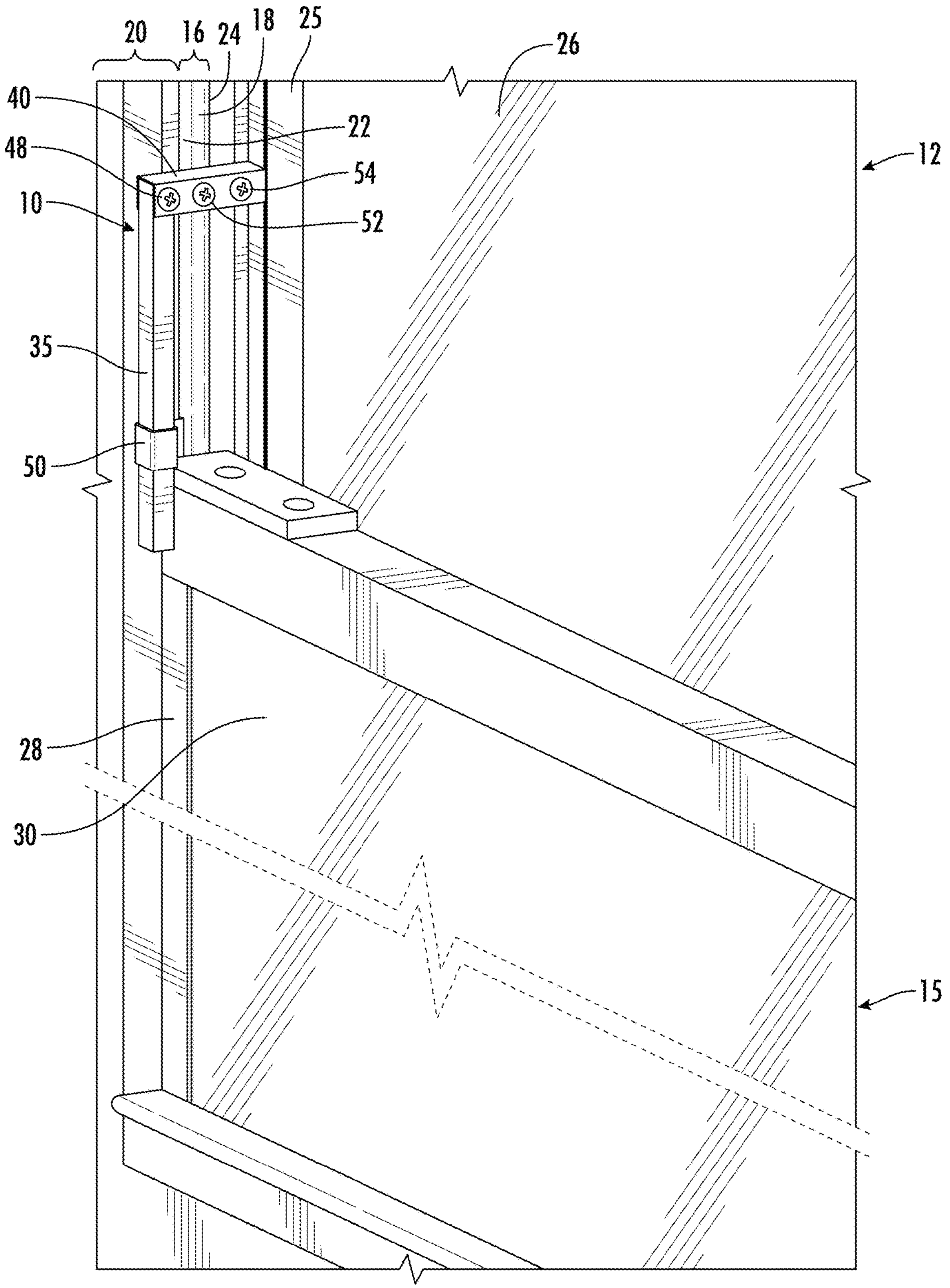
FIG. 2 is a perspective view of the window support of FIG. 1 wherein the bottom sash is in a closed position.

FIGS. 1 and 2 illustrate the window support 10 mounted to a window frame 20 having a top window sash 12 and a bottom window sash 15. The window frame 20 defines a longitudinal channel 16 which extends the length of the top 12 and bottom 15 sashes. Extending along the length of the longitudinal channel 16 of the frame 20 is a seal 18. The seal 18 is formed of a generally elastomeric material, such as rubber. The window channel 16 defines a proximal gap 22 and a distal gap 24 which extend on opposing sides of the seal 18. The top sash 12 includes a top sash frame 25 and top windowpane 26. The bottom sash 15 includes a bottom sash frame 28 and a bottom windowpane 30.

Figure 5:
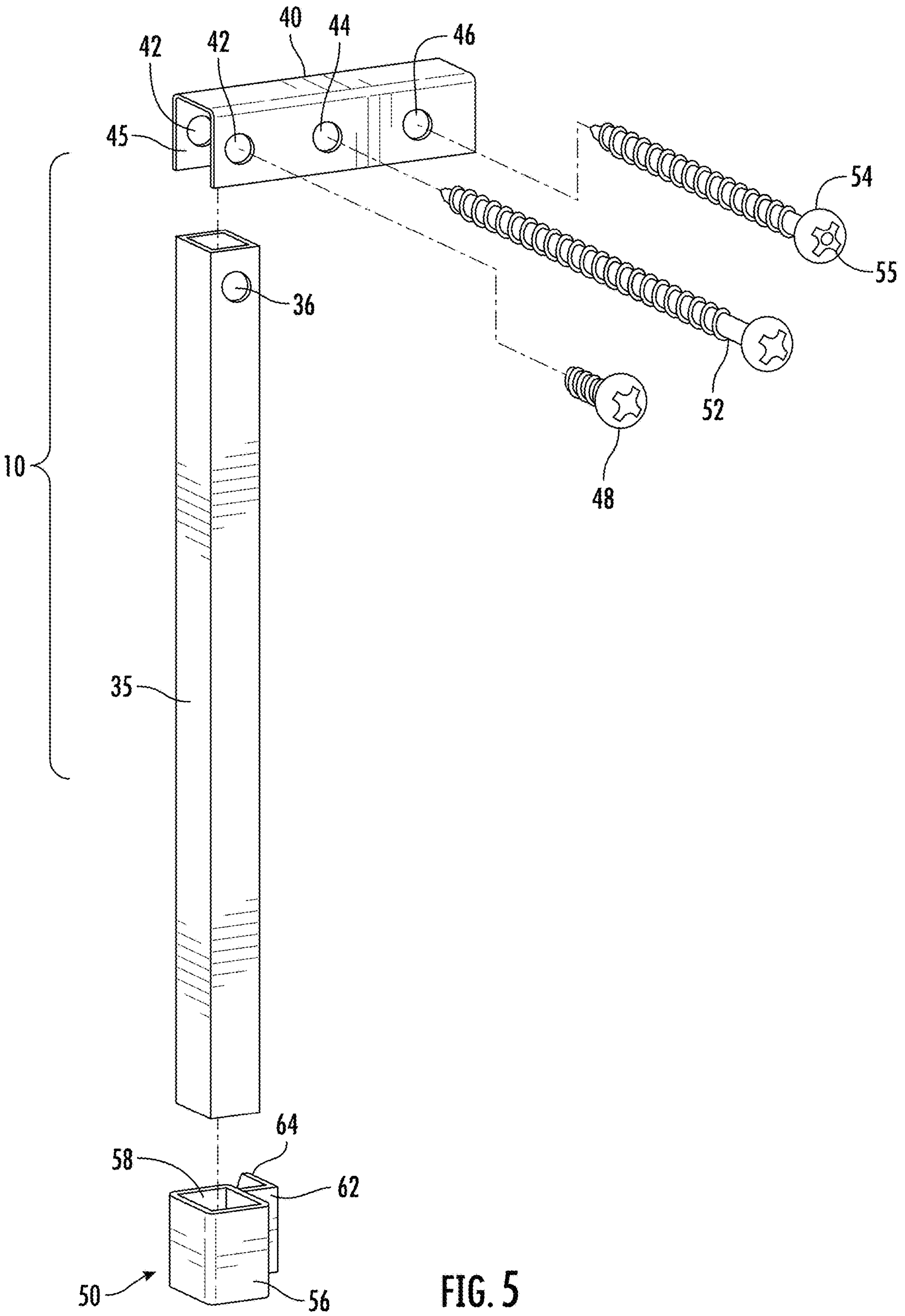
FIG. 5 is an exploded view of the window support of FIG. 3.

The window support 10 includes a longitudinal first member 35, a generally lateral second member 40, and a clamp 50. The longitudinal first member 35 may be formed of a solid material or hollow as shown. The first member 35 may have different geometric profiles, but as shown by way of example, the first member 35 has a square profile, if viewing in cross-section as best shown in FIG. 5. The first member 35 defines an aperture 36 adjacent its upper end. Similarly, the second member 40 may be formed of a solid or hollow material and may have various geometric profiles to cooperate with the first member 35 but, as shown, it is hollow and generally U-shaped. The second member 40 defines first apertures 42, second apertures 44, and third apertures 46 wherein each aperture has a corresponding aperture on the other sidewall of the second member 40 permitting screws to extend through the second member 40.

Figure 3:
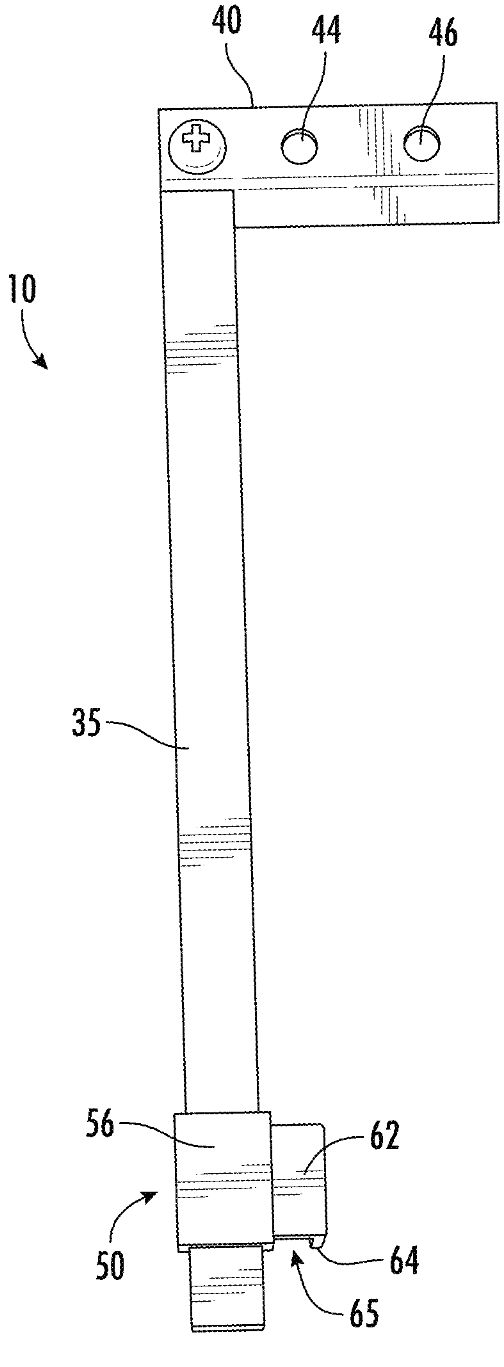
FIG. 3 is a side elevational view of the window support shown in FIG. 1 which is not attached to a window.
Figure 4:
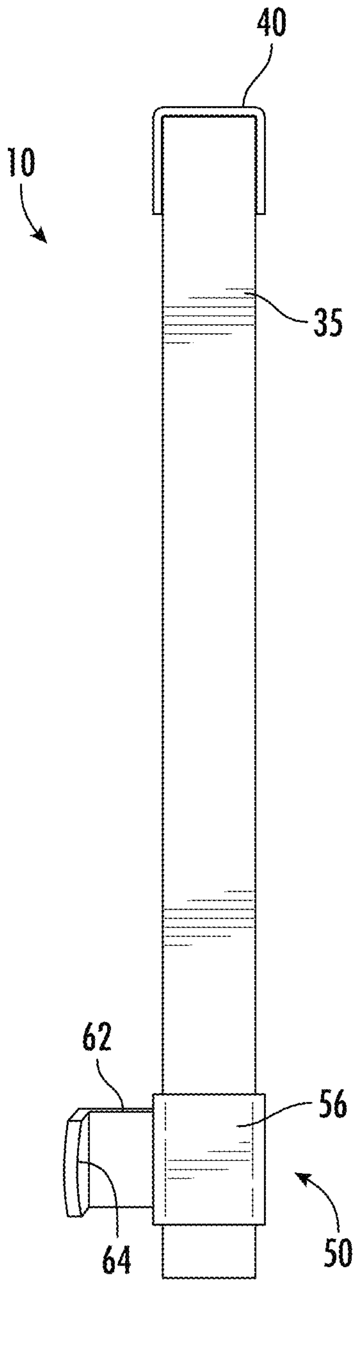
FIG. 4 is a front elevational view of the window support according to FIG. 3.

FIGS. 3 and 4, right side view and front elevation views, respectively, show the window support 10 assembled, but not mounted to a window. FIG. 5 is an exploded view of the window support 10. The generally U-shaped second member 40 defines an interior cavity 45 configured to receive the upper end of the first member 35. When the second member 40 is positioned on the first member 35, the aperture 36 and both apertures 42 substantially align. The aligned apertures 36 and 42 are configured for receipt of a proximal screw 48 for securing the window support members 35, 40.

As shown, the proximal screw 48 has a first predetermined length according to one aspect of the present invention, that is less than or equal to the distance between the two opposing horizontal side walls of the first member 35. According to another aspect the proximal screw 48 has a length at least as long as the width of the first member 35. The second aperture 44 is configured for receipt of a mounting screw 52 for mounting the window support 10 to the window frame 20. As shown, the mounting screw 52-has predetermined length sufficient to extend through the second member 40 and to penetrate into the window frame 20 to mount the window support to sufficiently provide structural strength to the window frame 20 and window support 10 connection, particularly with regard to ability to sustain extreme environmental conditions or unwanted intrusion. The third aperture 46 is configured for receipt of a distal safety screw 54 having a thread profile 55 explained in more detail below. By way of example, the proximal screw 48 has a length of between 0.25 inch and 1.0 inch, preferably about 0.375 (⅜) inches; the mounting screw 52 has a length of between 2.75 inches and 3.25 inches, preferably about 3.0 inches; and the distal safety screw 54 has a length of between 1.75 inches and 2.25 inches, preferably about 2.0 inches.

The clamp 50 includes a main body 56 defining a main body cavity 58 configured for receipt of the first member 35. As shown, the main body 56 and main body cavity 58 are substantially squared to accommodate the square profile of the first member 35. Of course, other shapes may be employed. Sufficient tolerances are provided between the clamp main body 56, its cavity 58 and the first member 35 wherein the clamp 50 is slidable along the length of the first member 35.

Figure 6:
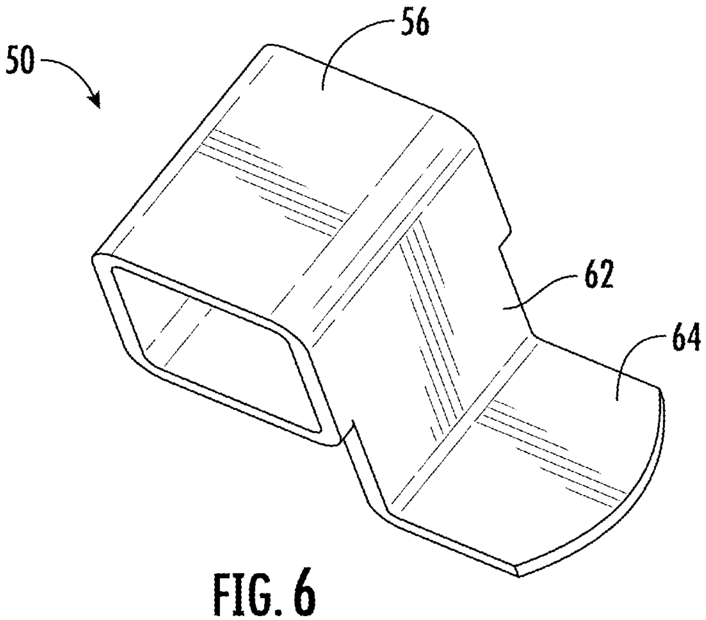
FIG. 6 is a perspective view of the clamp of the window support.
Figure 7:
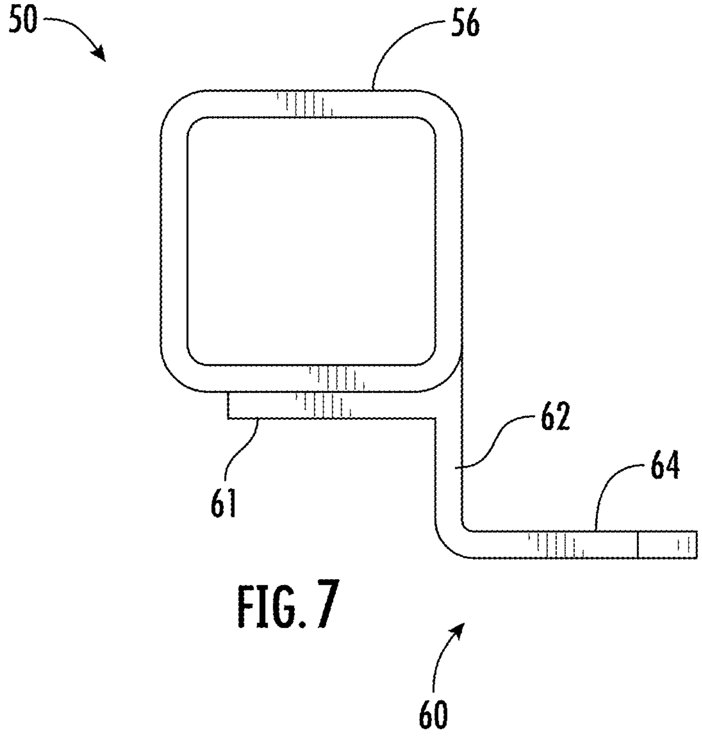
FIG. 7 is a side elevational view of the clamp of FIG. 6.

The clamp 50, best shown in FIGS. 6 and 7, includes a main body 56 configured for receipt of the first member 35. As shown, the main body 56 has an interior cavity 58 having a square configuration corresponding to the configuration of the first member 35. The main body 56 has a width and/or height, depending upon the orientation, which provides sufficient clearances on the first member 35 wherein the main body 56 slides along the length of the first member 35. The main body 56 is, thus, "free-floating" along the longitudinal length of the first member 35.

The clamp 50 further includes a mounting lever 60 shown in FIG. 7 including a first leg 61 for mounting the mounting lever 60 to the clamp main body 56. The first leg 61 is connected to the main body 56 by any means, such as by soldering the first leg 61 thereto. Alternatively, the clamp may be formed as a unitary structure, such as a molded structure with an integrated main body 56 and mounting lever 60 wherein the first leg 61 may be omitted. The mounting lever 60 also includes a distal leg 62 extending generally perpendicular to the first leg 61 wherein the distal leg 62 extends generally co-linearly with a side of the main body 56 of the clamp 50. The length of the distal leg 62 is predetermined based on the dimension of the window frame and window as explained below. A clamping flange 64 extends laterally, generally perpendicular to the distal leg 62. The clamping flange 64 has a distal edge that is generally curved as shown in FIG. 6. The clamping flange 64 has a length sufficient to cooperate with the window frame as explained below.

The window support 10 is assembled by inserting the bottom end of the first member 35 into the main body cavity 58 of the clamp 50 and the top end of the first member 35 into the second member cavity 45, in any order. The proximal screw 48, shown as having a Phillips head screw profile, is then inserted into first apertures 42 to secure the first 35 and second 40 members. The proximal screw 48 is self-threaded with a corresponding one of the first apertures 42. Two first apertures 42 are provided because the window support 10 is reversible and may be placed on either side of the window. Although the drawings show the window support 10 on the left side of a window frame 20, it is to be appreciated that it may likewise be applied on the right side of the window frame 20.

The window support 10 is then mounted to the window frame 20. This is accomplished by positioning the window support against the window frame 20 and positioning the clamping flange 64 against the distal edge of the window frame 20, between the window frame 20 and the scal 18 and within the proximal gap 22. The second member 40 is then secured to the window frame 20 by insertion of the mounting screw 52 within apertures 44 and then inserting the mounting screw 52 into the window frame 20 using a screwdriver or drill, for example, utilizing the Phillips screw head profile of the mounting screw 52. The safety screw 54 has a unique profile on its head requiring a specialty tool for added security and safety. Safety screws have a profile which require special matching security screwdriver or driver bit.

The window support 10 is mounted on the frame 20 at a height sufficient to limit the upward movement of the bottom sash 28 to provide a vent or opening A as shown in FIG. 1. As shown in FIG. 1, as the bottom sash is raised 28, the bottom edge of the clamp 50, such as the bottom edge of the distal leg 62 and/or the bottom edge of the main body 56, or the intersection thereof, are configured to cooperate with the bottom sash frame 28 and defines a window sash cooperating bottom edge which abuts the top edge of the bottom sash frame 28 which urges the clamp 50 upward along the first member 35 as it is raised. As shown in FIG. 6, the distal leg 62 has a width less than the width of the main body 56 thus defining a corner configured to cooperate with bottom sash 28. Thus, the clamping flange 64 traverses a length of the proximal gap 22, along the window frame 20 distal edge. The top edge of the clamp 50, such as the top edge of the main body 56 and/or the top edge of the distal leg 62 (or the intersection thereof) cooperates with and as shown in FIG. 1, contacts and abuts the second member 40 to prevent further upward movement of the bottom frame 15, thus limiting the height A of the vented bottom sash 15. As the bottom sash 15 is lowered, the clamp 50 also falls along the first member 35 as shown in FIG. 2 wherein the window is closed.

Thus, in the opened position, the distance A between the bottom windowsill and the bottom sash frame 28 is selective by selective placement of the window support 10 on the window frame 20. For example, if a four-inch vent is desired, the second member 40 is mounted on the window frame 20 a corresponding distance wherein there is four inches between the bottom edge of the clamp 50 and the top of the bottom sash frame 28 when the window is closed as shown in FIG. 2.

The first member 35 and second member 40 are formed of a material providing sufficient strength for its intended use. For example, to provide strength sufficient for extreme weather conditions, such as wind, steel or aluminum is utilized for the window support 10 members. If merely limiting the opening distance A is intended, less rigid materials, such as molded or extruded materials may be selected. The length of the first 35 and second members 40 are selected based on the window dimension of the intended use. By way of example, the first member 35 may be six inches long and have a diameter of ⅜ inches. Also be way of example, the second member 40 may have a length of 1¾ inches (such as for an aluminum window) or 2 inches (such as for a vinyl window) and a diameter of ½ inches. The clamp 50, by way of example, has a ½ diameter and a ½ inch offset of the mating flange 64. It is preferred that the length of the first member 35 is greater than the length of the second member 40, for example, more than double the length.

The window support 10 according to the present invention limits the opening of the bottom sash 15 a predetermined distance A which provides safety from unintended egress, such as a child. It also provides unintended egress from an unwanted intruder who may have entered the facility or home through another entrance. Unintended ingress from the intruders entering the window is also limited or prevented by an intruder opening the window.

The window support 10 also provides structural integrity to the window during conditions of extreme environmental conditions, such as high winds. Double hung windows provide tilting mechanisms for the top and bottom sashes to enable tilting inward for cleaning. Such windows are more susceptible to wind forcing unintended tilting of the window sashes. As shown in FIGS. 1 and 2, a lower portion of the first member 35 extends proximal to the bottom sash frame 28. With the window support 10 secured to the window frame 20, proximal tilting of the bottom sash frame 28, which tilts inwardly from the top, is precluded. Likewise, the distal end of the second member 40 of the window support cooperates with the top window sash frame 25 to prevent its tilting, inwardly from the top. The window support 10, thus, braces against tilting of the window sashes, such as in high wind conditions.

While exemplary embodiments have been shown and described above for the purpose of disclosure, modifications to the disclosed embodiments may occur to those skilled in the art. The disclosure, therefore, is not limited to the above precise embodiments and that changes may be made without departing from its spirit and scope.

The invention claimed is:

1. A window support for a double hung window having a window frame, a top sash, a bottom sash, and a window channel defined by the window frame wherein said window support limits opening of the bottom sash and provides structural integrity to the window, said window support comprising:

a first longitudinal member having a first predetermined cross-section profile and a top and bottom end;

a second horizontal member having a proximal end and a distal end wherein said proximal end is configured to receive said first longitudinal member top end; and a clamp comprising a main body, a top edge, a bottom sash cooperating bottom edge, and a mounting lever, said main body defining a cavity having a predetermined cross-section profile and wherein said cavity predetermined cross-section profile is configured for receipt of at least said bottom end of said first longitudinal member, wherein said clamp is supported on said first longitudinal member and is slidable there along between a closed position wherein said clamp is positioned below said top end of said first longitudinal member and an opened position wherein said clamp is positioned adjacent said top end of said first longitudinal member, and wherein said clamp mounting lever comprises a distal leg extending from said clamp main body and a clamping leg extending perpendicular from said distal leg wherein said clamping leg is configured to to be positioned with the window channel of the window frame, and wherein upward movement of the bottom sash causes the bottom sash to abut said bottom sash cooperating bottom edge and raise said clamp along said first longitudinal member and said clamp top edge contacts said second horizontal member in said opened position wherein further movement of said clamp on said first longitudinal member is limited when said clamp top edge abuts said second horizontal member in said opened position.

2. The window support according to claim 1 wherein said mounting lever further comprises a mounting leg for securing said mounting lever to said main body.

3. The window support according to claim 1 wherein said first predetermined cross-section profile of said first longitudinal member is defined by four sides including opposing longitudinal side walls and wherein at least one of said opposing longitudinal side walls defines a first aperture adjacent the top end of said first longitudinal member and wherein said proximal end of said second horizontal member has a second cross-section profile defined by at least two opposing horizontal side walls, wherein at least one of said horizontal side walls defines a second aperture adjacent said proximal end of said second horizontal member wherein when said first longitudinal member top end is received by said second horizontal member proximal end, said first and second apertures are aligned.

4. The window support according to claim 3 wherein another one of said opposing longitudinal side walls of said first longitudinal member defines a third aperture opposing said first aperture and wherein the other one of said horizontal side walls of said second horizontal member define a fourth aperture opening said second aperture, wherein said window support is reversible for mounting to either side of the window.

5. The window support according to claim 3 further comprising a proximal screw configured for receipt by said at least one longitudinal side wall first aperture and said at least one of said horizontal side walls second aperture to secure said first longitudinal member to said second horizontal member.

6. The window support according to claim 5 wherein said proximal screw has a length less than or equal to a distance between said at least two opposing horizontal side walls.

7. The window support according to claim 3 further comprising a mounting screw and said at least two opposing horizontal side walls define third and fourth opposed apertures and said mounting screw has a length sufficient to extend through said third and fourth apertures of said at least two opposing horizontal side walls and to extend into the window frame to mount said window support thereto.

8. The window support according to claim 7 further comprising a safety screw having a head with a safety profile and wherein said mounting screw has a head with a profile different than said safety profile and wherein said at least two opposing horizontal side walls define fifth and sixth opposed apertures configured for receipt of said safety screw and said safety screw has a length that extends through said fifth and sixth apertures of said at least two opposing horizontal side walls and extends into the window frame to mount said window support thereto.

9. The window support according to claim 8 wherein said length of said safety screw is less than said length of said mounting screw.

10. The window support according to claim 1 wherein said bottom sash cooperating bottom edge is defined by a bottom edge of said distal leg.

11. The window support according to claim 1 wherein said distal leg of said mounting lever extends generally perpendicular to a wall of said clamp and said clamping leg of said extends outwardly and horizontally from said distal leg.

* * * * *